G. A. LUTZ.
BASE FOR SUPPORTING SWITCHES AND THE LIKE UPON CONDUITS.
APPLICATION FILED FEB. 23, 1907.
917,327.
Patented Apr. 6, 1909.
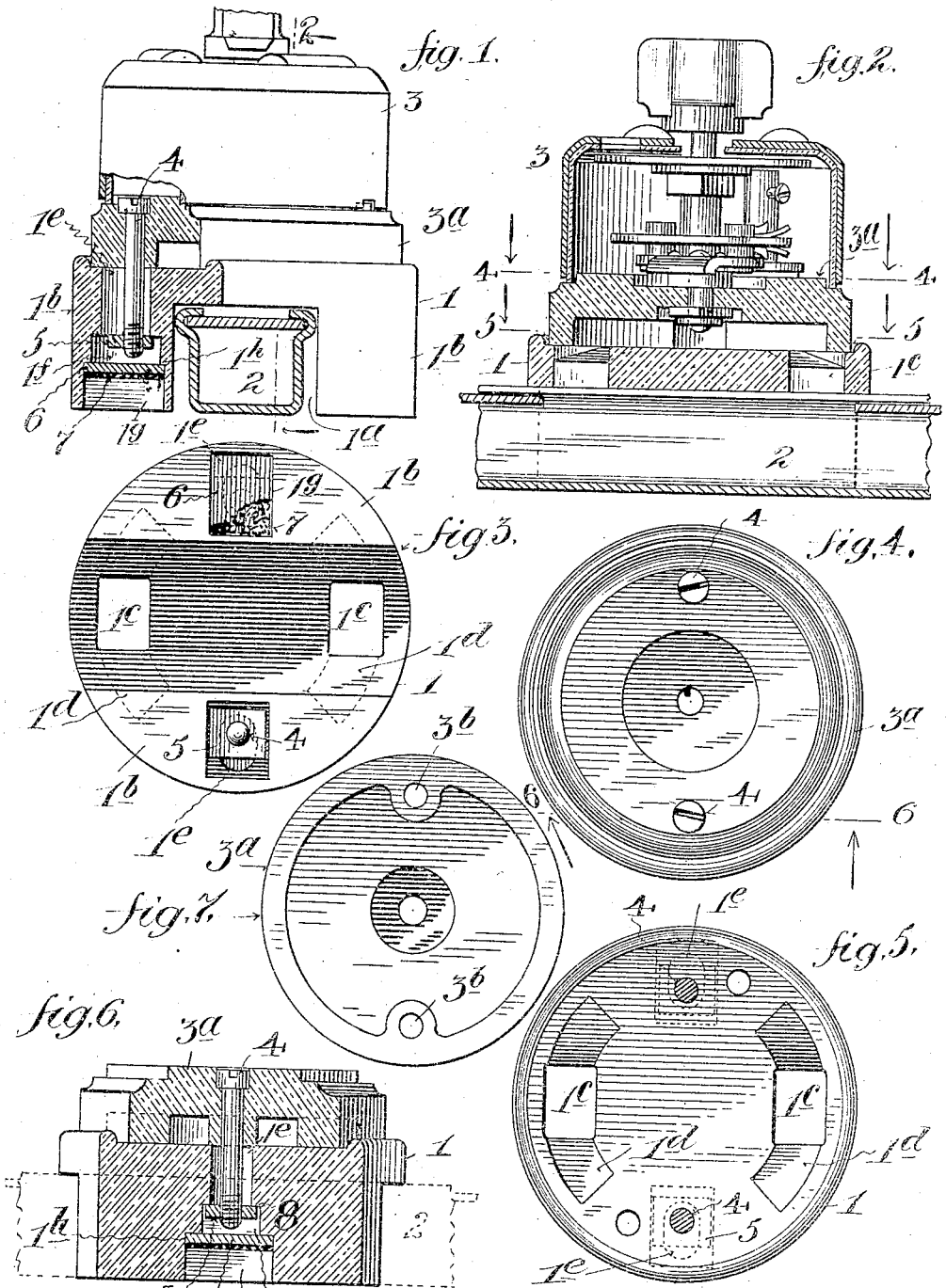

UNITED STATES PATENT OFFICE.

GEORGE A. LUTZ, OF NEW YORK, N. Y.

BASE FOR SUPPORTING SWITCHES AND THE LIKE UPON CONDUITS.

No. 917,327.   Specification of Letters Patent.   Patented April 6, 1909.

Application filed February 23, 1907. Serial No. 359,007.

*To all whom it may concern:*

Be it known that I, GEORGE A. LUTZ, a citizen of the United States, and resident of New York city, borough of Brooklyn, New York, have invented certain new and useful Improvements in Bases for Supporting Switches and the Like Upon Conduits, of which the following is a specification.

The object of my invention is to provide improved means to permit the ready adjustment of switches, rosettes, and analogous fittings to bases adapted for use in connection with conduits, such as shown in Letters Patent granted to Clarence C. Sibley and myself October 30, 1906, No. 834,686, my present improvements being designed more readily and conveniently to permit switches, rosettes, and the like, to be connected with a base, so as to receive switches and the like of varying dimensions.

In carrying out my invention I provide a base, preferably of insulating material, with slots or openings on opposite sides of its center, and recesses communicating with said slots, and holding pieces slidably fitted in said recesses adapted to receive screws projecting from switches or analogous fittings, whereby said holding pieces may be adjusted to receive said screws for holding said switch or fitting upon the base.

The invention also comprises the novel arrangements of parts that will be more fully hereinafter set forth and then pointed out in the claims.

Reference is to be had to the accompanying drawings forming part hereof, wherein—

Figure 1 is a partly sectional side view illustrating my improvements in connection with a well known type of snap switch and mounted upon a conduit, Fig. 2 is a sectional view, substantially on the line 2, 2, in Fig. 1, Fig. 3 is an inverted plan view of the base, Fig. 4 is a plan view of the switch base, parts removed, substantially on the line 4, 4, in Fig. 2, Fig. 5 is a plan view of the base, along the line 5, 5, in Fig. 2, Fig. 6 is a detail sectional view, substantially on the line 6, 6, in Fig. 4, and Fig. 7 is an inverted plan view of the switch base.

Similar numerals of reference indicate corresponding parts in the several views.

The numeral 1 indicates a base, which may be of any suitable material, preferably of insulating material, such as porcelain, and which is provided on its under side with a gain or recess $1^a$ adapted to receive a conduit, indicated at 2, whereby the base may be fitted upon or over the conduit, so that the side portions $1^b$ of the base will be on opposite sides of the conduit.

At 3 is indicated, generally, a switch, shown as a snap switch, of any well known construction, the base $3^a$ of which is adapted to fit upon base 1. The upper part or top of base 1 is shown provided with holes $1^c$ that communicate with the gain $1^a$ to permit the wires from conduit 2 to be drawn through the top portion of the base for connection with electric fittings, and the upper surface of the base at the sides of the holes $1^c$ is shown provided with recesses, at $1^d$, for the passage of the wires, all of which parts are substantially the same as shown in said Patent 834,686.

The base 1 is shown provided with radially disposed slots $1^e$ on opposite sides passing into the side members $1^b$ and adapted to receive screws 4 that project from holes $3^b$ in the base $3^a$ of the switch or fitting 3, the slots or openings $1^e$ being of sufficient size to permit the screws 4 to move freely therein in various directions. The parts $1^b$ of the base also on their under sides have recesses $1^f$ somewhat wider and longer than the slots $1^e$, within which recesses are fitted movable holding pieces or plates 5 shown provided with threaded holes adapted to receive the screws 4. The recesses $1^f$ are preferably rectangular in outline, and the holding pieces 5 are of substantially the same shape, but of less length than the recesses $1^f$ to permit said holding pieces to slide radially with respect to base 1. The holding pieces or plates 5 are movably retained within the recesses $1^f$ by means of plates 6 shown fitted within recesses $1^g$ in the side parts $1^b$ of base 1, the recesses $1^g$ being shown larger than the recesses $1^f$ providing shoulders $1^h$ against which the plates 6 fit, and said plates may be held in the recesses $1^g$ by wax or the like, 7. The recesses $1^f$ are shown of greater depth than the thickness of the holding pieces 5, whereby the latter may move freely up and down and may be drawn by the screws 4 against the shoulders 8.

When the switch or analogous fitting 3 is to be fitted to base 1 it is placed thereon and the screws 4 from the switch are passed through the slots $1^e$ of base 1 and fitted to the holes in the holding pieces or plates 5, which for the purpose can be adjusted radially in their recesses 1ᶠ, and then the screws are turned to draw the holding pieces 5 into contact with the shoulders 8, whereby the switch or fitting will be firmly held upon base 1. As bases 3ᵃ of different switches or fittings may vary in dimensions or their holes 3ᵇ for the screws 4 be at different distances apart, the screws 4 may be fitted to the holding pieces or plates 5 because of the radial adjustability of the latter with respect to base 1 and as the screws 4 may readily fit in proper positions within the radially disposed slots 1ᵉ of base 1 within which the screws 4 may move.

My improvements provide a simple and efficient means for enabling different makes and sizes of switches and analogous fittings to be readily adjusted to bases adapted to fit over suitable conduits, so that the base 1, within certain limits, may be adapted as a substantially universal base for different switches and the like, thereby overcoming the necessity of making each base, as 1, adapted for a special switch or analogous fitting.

By means of my improvements electric fittings may be attached to bases while the latter remain mounted over conduits, thereby overcoming the necessity of removing the bases for such purpose.

Having now described my invention what I claim is:—

1. The combination of a base provided with slots to movably receive screws, screws, movable holding pieces supported in line with said slots and adapted to receive said screws, and means for supporting said holding pieces independent of the screws.

2. The combination of a base provided with slots adapted to receive screws, said base having recesses communicating with said slots, screws in said slots, holding pieces mounted in said recesses to have movement in the direction of the length of said slots and adapted to receive said screws and means to support said holding pieces independent of the screws.

3. The combination of a base provided with slots adapted to receive screws, said base having recesses communicating with said slots, screws in said slots, holding pieces movably mounted in said recesses adapted to receive said screws, and plates secured to the base in line with said recesses for supporting holding pieces therein.

4. The combination of a base having radially disposed slots on opposite sides of its center, the base also having recesses in line with said slots, screws in said slots, holding plates located in said recesses in line with said slots and adapted to receive screws passing through said slots, and means for retaining said holding pieces in said recesses independent of the screws.

5. The combination of a base having a gain on one side adapted to receive a conduit, said base having slots on opposite sides of said gain and having recesses beneath the slots and communicating therewith, screws in said slots, holding pieces movably supported in said recesses adapted to receive said screws that pass through said slots, said slots being of greater area than the screws, and means for retaining said holding pieces in said recesses.

6. A base having slots on opposite sides of its center and provided with recesses of greater area than and communicating with said slots, holding pieces in said recesses of greater area than said slots, and of less area than said recesses to permit said pieces to move in the direction of the greater dimensions of the slots, and means for retaining said holding pieces in said recesses.

7. A base having slots on opposite sides of its center and provided with recesses of greater area than and communicating with said slots, holding pieces in said recesses of greater area than said slots, and plates secured to said base in line with said recesses for retaining said holding pieces in said recesses.

8. A base provided with radially disposed slots on opposite sides of its center and having recesses entering the under side and communicating with said slots, holding pieces of greater area than the slots but of less length than the slots in one direction and having sides engaging the sides of the recesses, and means for movably retaining said holding pieces in said recesses.

9. A base provided with slots on opposite sides of its center and having recesses communicating with said slots and also having recesses of greater area than the first named recesses communicating therewith, plates secured in the second named recesses closing the open ends of the first named recesses, and holding pieces movably retained in the first named recesses.

10. A base provided with a gain in one side and having extended portions on opposite sides of the gain, said base having slots on opposite sides of the gain entering said extended portions and also having recesses in said extended portions of greater area than said slots communicating therewith, plates closing the open ends of said recesses, and holding pieces movably retained in said recesses.

GEO. A. LUTZ.

Witnesses:
T. F. BOURNE,
J. A. GRAVES.